May 9, 1939.  F. W. COTTERMAN  2,157,230
HYDROMECHANICAL POWER TRANSMISSION MECHANISM
Filed Feb. 26, 1937
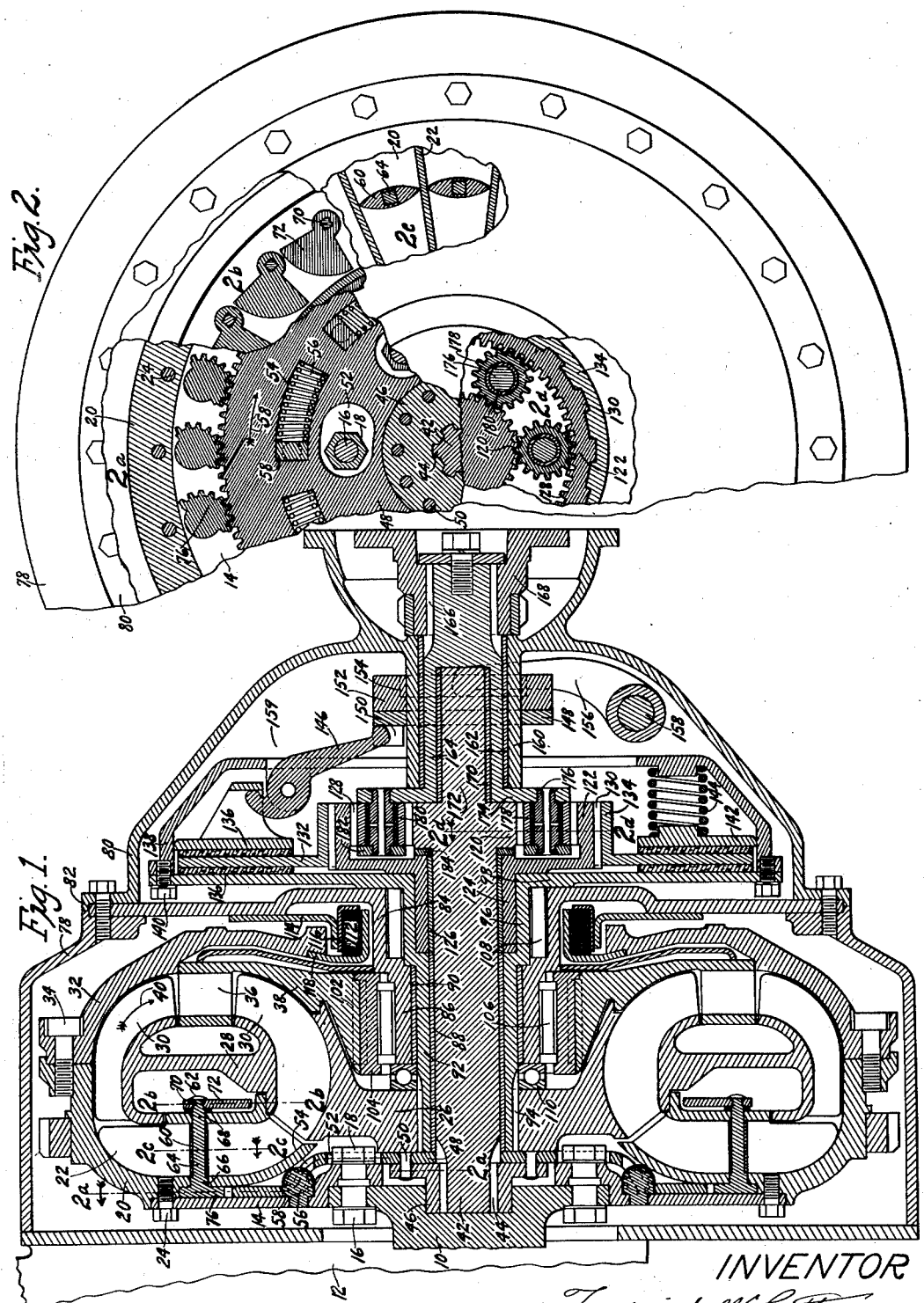
INVENTOR
Frederick W. Cotterman Patented May 9, 1939

2,157,230

UNITED STATES PATENT OFFICE 2,157,230

HYDROMECHANICAL POWER TRANSMISSION MECHANISM

Frederick W. Cotterman, Dayton, Ohio, assignor of one-half to Bessie D. Apple, Dayton, Ohio Application February 26, 1937, Serial No. 127,863

23 Claims. (Cl. 74—189.5)

This invention relates to power transmission mechanism for connecting a driving and a driven member in variable speed ratio, and particularly to that type of transmission wherein a turbine is combined with toothed gearing to provide a more extended range. It is particularly adapted to automotive use.

As is well known in the art, the "Föttinger" fluid coupling, as applied to automotive use, comprises a bladed impeller, driven by the engine, and a bladed rotor placed adjacent and in axial alignment with the impeller, the blades being so shaped that the fluid circulates in corkscrew fashion between impeller and rotor blades. This device functions merely as a coupling or clutch, and while slippage between the impeller and rotor results in a speed reduction, there is not, as is usual in speed reducing mechanism, any torque multiplication.

As a result of this shortcoming in the fluid coupling, a turbine mechanism has been proposed wherein the blades of the rotor are cut away for a part of their length and replaced by blades mounted on a separate member having means to hold it against rotation. By this separate member, called a stator, the circulation of the fluid by the impeller between the rotor blades causes the fluid to react against the stator blades whereby the rotor is driven forward at reduced speed and with multiplied torque.

A difficulty in the turbine mechanism proposed is that it is required to act both as a clutch and as a torque multiplier and these two functions are inconsistent.

As a clutch for instance, it is required that if the impeller is rotating say 300 R. P. M. and the rotor 3 R. P. M., there will be substantially zero torque transmission, whereas if the mechanism were a perfect torque multiplier, the torque of the impeller would in this case have been multiplied one hundred fold in the rotor.

To obviate this difficulty in the proposed mechanism means have been added to restrain the flow of fluid through the impeller by blocking the space between the impeller blades by valves. These valves are normally closed, but are provided with centrifugal weights which act at a predetermined speed to open the valves. By this means the impeller does not act as an impeller until a considerable engine speed is reached. Below the predetermined speed, therefore, the impeller has better releasing qualities, such as are required of a clutch that is to automatically release when the engine is lowered to its idling speed.

But an inherent difficulty in the proposed mechanism lies in the fact that the rotor and stator blades cannot be so designed as to be efficient over a very wide range of speeds, that is, the efficiency as a torque multiplier is at its highest when the speed between the rotor and stator is that for which the blades were designed. The efficiency, therefore, of the mechanism as a torque multiplier falls off very rapidly both above and below the best speed. It follows that when starting a vehicle from a dead stop, particularly on an up grade, the build up, i. e., the acceleration, is not all that could be desired.

As an aid to this condition, the proposed mechanism has added thereto a planetary gear set comprising, a ring gear, a sun gear and a series of planet pinions in mesh with both the ring gear and the sun gear, the planet pinion carrier being the driven member, the ring gear being optionally connectible by manual means either to the housing to hold it against rotation for a low geared drive, or to the rotor for a higher hydraulic drive, the sun gear being connected to the rotor for the low geared drive and to the impeller for the hydraulic drive.

Now the difficulty with the proposed arrangement is to manually shift out of the low geared drive and into the hydraulic drive at the proper time, i. e., at the time the hydraulic unit becomes efficient enough to warrant discontinuance of the geared drive. There is the further difficulty that the mechanism, functioning as a clutch, never releases completely, whereby a manual shift into or out of a toothed connection becomes difficult and necessitates further mechanism to overcome the clutch drag.

It is therefore the object of this invention to eliminate all toothed means in a mechanism of this character and all manually shiftable devices, and to provide a mechanism in which a geared drive functions independently of the hydraulic drive in raising the vehicle speed to a point where the rotor speed becomes hydraulically efficient, then automatically changes completely from the geared drive to the hydraulic drive.

It is a further object of this invention to interconnect the geared drive and hydraulic drive with a mechanical means which will insure that the gear drive is eliminated completely the instant the hydraulic drive becomes effective.

It is a further object of the invention to provide means which will automatically change from the geared drive to the hydraulic drive according to the necessities of the case, i. e., which will hold in gear drive longer as the torque being transmitted is greater.

It is a further object of the invention to provide means which will insure that the valves, which prevent the impeller of the hydraulic unit becoming effective as an impeller, will remain closed up to the exact instant that the gear drive is eliminated, to the end that there will be no clutch effect between the impeller and rotor while gear drive is in effect.

It is a further object of the invention to provide a separate clutch of more or less conventional design for connecting the ring gear to the rotor, for the reason that the sun gear being permanently connected for rotation with the engine requires that the ring gear revolve backwardly to allow the planet pinion carrier to remain stationary while the engine is idling, to the end that the ring gear which must be connected to the rotor during hydraulic drive, may be allowed to revolve backwardly during engine idling without turning the rotor backwardly with it against the forward drag of the impeller.

It is a further object of the invention to provide a roller clutch which will at all times prevent backward rotation of the rotor, to the end that when it is desired to effect gear drive by holding the ring gear against backward rotation it may readily be done by clutching the said ring gear to the rotor to the end that when later the hydraulic unit becomes effective, the rotor and ring gear will already be connected together for forward rotation as they must be during hydraulic drive.

Other objects and meritorious features will become apparent as the invention is described in greater detail and reference is made to the drawing wherein, Fig. 1 is a vertical axial section through the mechanism.

Fig. 2 is a rear end view with parts broken away at different depths, 2a being broken away to the line 2a—2a Fig. 1, 2b being broken away to the line 2b—2b Fig. 1, 2c being broken away to the line 2c—2c Fig. 1, and 2d being broken away to the line 2d—2d Fig. 1.

*Construction*

The crank shaft 10 of an engine 12 has the impeller plate 14 secured thereto by the bolts 16 and nuts 18. The impeller 20 has blades 22 and is secured to the plate 14 by screws 24.

The rotor comprises a main body 26, a core 28 and blades 30 arranged in two stages. An impeller cover 32 is secured to the impeller 20 by the screws 34. The cover 32 fits as closely around the rotor blades 30 as will permit rotation at different speeds between the two parts.

At the rearward side, the rotor blades 30 and a small section of the core 28 are cut away to admit the stator blades 36. The stator blades 36 are supported on the stator body 38, and are so angled that movement of a fluid between the rotor blades 30 in the direction of the arrow 40 impinges on the stator blades to drive the rotor forward, by forward being meant clockwise when standing at the left of the drawing.

The drive shaft 42 is splined at the front end at 44. An internally splined hub 46 fits over the splines 44 and slidably into the end of the crank shaft 10. A large but thin gear 48 is secured to the hub 46 by rivets 50. Oblong slots 52 in the gear clear the nuts 18 so that the gear may have slight rotative movement with respect to the plate 14. Arcuate openings 54 through the gear receive the springs 56 and studs 58, the shanks of the studs being riveted in the plate 14. The springs 56 always urge the gear 48 in the direction of the arrow 58 with respect to the plate 14.

Between the impeller blades 22 are the butterfly valves 60. The valve stems 62 are squared at 64 where they pass through the valves, rounded at 66 and 68 where they have bearing in the impeller, and squared to a smaller size at 70 where they pass through the centrifugal weights 72. Pinion segments 76 are integral with the stems 62 and are in constant mesh with the gear 48.

It will be seen that the centrifugal weights 72, when revolved about the axis of the device, constantly urge the valves 60 to be opened, but that any torque load delivered to the shaft 42, by the impeller, opposes the weight force and urges the valves to remain closed. The springs 56 assist the torque load in opposing the weights and add their force to keep the valves in the closed state.

The housing 78 which surrounds the hydraulic unit and the housing 80 which contains the gearset are separated by a plate 82 which has a forwardly extending hub part 84, a continuation of which is of smaller diameter as at 86.

Surrounding the drive shaft 42 and within the hub part 86 and separated therefrom by the bearing sleeves 88 and 90 is the long rotor sleeve 92. At the forward end this sleeve is externally splined as at 94 and internal splines in the rotor body 26 fit snugly over these external splines. At the rearward end, the sleeve first enlarges as at 96, then extends through and into the gear housing 80 where it has integral a clutch disc 98.

Held by the key 102 in the stator body 38 is the stator hub 104 which is internally formed to receive the combination roller bearing and roller brake 106.

The hub 86 is externally formed for this combined brake and bearing which permits the stator to rotate forwardly but not backwardly. A second roller brake 108 within the hub part 84 and around the enlarged part 96 allows the rotor body 26 to rotate forwardly but not backwardly.

A thrust bearing 110 holds the rotor in its forward position. A felt seal washer 112 held by retaining members 114, 116 and 118 keeps the hydraulic fluid from leaking out into the housing 78.

The sun gear 120 is integral with the drive shaft 42. The ring gear 122 has a forwardly extending hub 124 provided with a bearing sleeve 126 which is a running fit on the shaft 42. The hub 124 fits loosely in the enlarged part 96 of the rotor sleeve 92. The ring gear 122 has internal gear teeth 128 and external clutch plate splines 130.

The clutch plate 132 has a rearwardly extending hub 134 which is internally splined to be slidable over the splines 130. Plate 132 has secured thereto the cork facings 136, cork being preferred because the facings must operate in an oil bath.

The clutch cover 138 is secured to the clutch disc 98 by the screws 140. The clutch pressure plate 142 is held engaged by the springs 144. Dogs 146, carried on the cover 138 operate to overcome the clutch springs and disengage the clutch in the usual manner. The clutch dog collar 148 has lugs 150 straddling the ends of the dogs to cause the collar to rotate with the dogs. The clutch pedal collar 152 is flattened on both sides as at 154 to prevent its turning in the clutch pedal fork 156. A standard clutch pedal (not shown), is secured to the end of the shaft 158 outside the housing 80. This friction clutch may be broadly designated by the numeral 159.

The housing 80 has a long hub 160 extending forwardly and fitted with a bearing sleeve 162. The driven member or planet pinion carrier 164 is runningly fitted to this bearing sleeve. At the rear end the driven member is splined at 166 to receive the universal joint member 168. At the forward end, the driven member is concentrically bored and fitted with the bearing sleeve 170 within which a reduced end 172 of the drive shaft 42 is runningly fitted. At the forward end a flange 174 carries the six studs 176 upon which the planet pinions 178 rotate. Pinions 178 contain the bearing sleeves 180 which are runningly fitted to the studs 176 and a drive fit in the pinions. A ring 182 provides outboard bearing for the ends of the studs 176.

The teeth of the gears are preferably helical but should be of as small a helix angle as possible preferably not over 15 degrees. If the helix angle is made left hand, the thrust of the gears under load will be forward on the sun gear and rearward on the ring gear, whereby the thrust washer 184 will receive all of the thrust and the thrust will be otherwise balanced.

In the mechanism shown and described no provision is made for reversing, the intention being to employ the present invention in connection with an auxiliary gear box which would contain selective means for forward, neutral, reverse, and if desired, overdrive connections.

In my copending applications Serial Numbers 26,765, 59,879 and 89,141, filed June 15th, 1935, January 20th, 1936 and July 6th, 1936 respectively, I disclose several auxiliary gear boxes of this type suitable to be secured to the rear end of the structure shown. In my copending application Serial Number 40,946, filed September 17th, 1935, I show a rear axle having such an auxiliary gear box incorporated in the differential housing. In all of these applications, I show structures whereby, by the addition of a single planetary gear train of the type herein shown, I provide connections for direct drive forward, overdrive forward, neutral and reverse ratios. When such a gear box or axle is employed the operation of the herein disclosed mechanism may be described as follows:

Operation

By shifting the auxiliary gear set to a neutral position, the engine may be started and warmed up in the usual manner. As long as the neutral position is maintained there will be no connection between the herein shown mechanism and the wheels and consequently the drive shaft and the driven shaft, the impeller, rotor, stator and gear-set will all revolve in unison.

The clutch pedal may now be depressed and the pressure plate 136 drawn away from the clutch plate 132. In common practice an anti-friction bearing is preferable between the clutch collars 148 and 152 so that the collar 148 may as freely as possible as long as the clutch pedal is depressed.

In the present invention it is desirable that there be considerable friction between the collars 148 and 152 so that, when the clutch pedal is depressed, the rotor 26, the clutch disc 98 and pressure plate 136, instead of continuing to revolve at engine speed, as in conventional mechanism of this class, will be caused to come to rest, the parts 148 and 152 serving as a brake to effectuate this purpose. It should be noted that the impeller 20 is now rotating at a low idling speed with the valves 60 closed, whereby little driving force is imparted to the rotor and consequently little braking force is required to hold the rotor stationary.

While the pedal is thus depressed, the connection to the wheels is made. When the clutch pedal is now released, and the clutch engaged, the planet pinion carrier 164, due to vehicle inertia, tries to remain stationary, which would rotate the ring gear 122 backwardly through the pinions 178. But since the clutch is now engaged the ring gear may not revolve backwardly without rotating the rotor 26 backwardly, and the rotor 26 may not rotate backwardly because of the roller brake 108.

It follows that as soon as the clutch 159 is engaged, the clutch, the rotor 26, and ring gear 122 all come to a dead stop. When this occurs the driven member 164 is rotated forwardly at one-third the speed of the sun gear 120, i. e., at one-third engine speed. Since the valves 60 are at this time completely closed, the impeller 20 is not now acting as an impeller, and the drive is strictly a 3 to 1 gear drive.

This fulfills one of the objects of the invention, i. e., the hydraulic unit is prevented from operating as such at the low speeds at which it is highly inefficient. This prevents the churning and heating of the hydraulic medium at a time when hydraulic transmission could only be had at a considerable loss of power which must necessarily be converted to heat.

Now the speed at which the change from gear drive to hydraulic drive will take place depends upon the engine speed at which the valves 60 will open, and, if the control of these valves were by speed responsive means only, i. e., by the weights 72 and springs 56, the valves would always open at a given speed, and it might happen, when the load being carried through the gears was very heavy, that the rearward ring gear reaction might be greater than the forward hydraulic force imparted to the rotor, in which case the two forces would be acting against each other and power be wasted.

It is for this reason that the opening of the valves 60 is arranged to be governed by both speed and torque, i. e., because of the fact that the valves are geared, through the segments 76 and gear 48, to the sun gear 120, the engine speed at which the hydraulic unit may become effective will always be in proportion to the load being carried by the planetary gear-set.

The weights 72, segments 76, gear 48 and springs 56 are so proportioned that, when a vehicle speed of no more than 6 M. P. H., has been attained, the fuel may be completely interrupted so as to reduce the load on the sun gear to zero, and the valves 60 will open and the shift from the gear drive to the hydraulic drive will take place. If, however, the fuel is continued at a maximum, so as to apply full engine power to the sun gear 120, the valves 60 will be held closed until a vehicle speed of 18 M. P. H. is attained.

The reason why it may be advantageous to have the mechanism shift from gear to hydraulic drive at 6 M. P. H., under one load condition and not until 18 M. P. H., under another load condition is because the hydraulic unit shown is comparatively efficient for transmitting moderate power, say 25 H. P., at 6 M. P. H., but does not become efficient for transmitting say 100 H. P., until a much higher speed is reached.

Take for example a condition wherein maximum acceleration is being effected by application of maximum engine power, so that the gear drive has been held in up to 18 M. P. H., before the valves 60 were opened. Now the size of the hydraulic unit as compared to the engine employed is such that when the valves 60 are opened, the engine, now driving the impeller 20 with open valves, at the high engine speed reached at 18 M. P. H., gear drive, will create a greater forward force on the rotor 26 than the ring gear 122 exerts to drive the rotor rearwardly.

This forward rotor force is hydraulically attained by circulation of the hydraulic fluid by the impeller 20 through the rotor 26 in the direction of the arrow 40, causing the fluid to impinge on the blades 36 of the stator 38 which is held against backward rotation by the roller brake 106.

Since the force applied hydraulically to rotate the rotor forwardly is now greater than the force applied through the ring gear to rotate the rotor backwardly, the roller brake 108 will be unloaded and the ring gear 122 started forwardly.

The hydraulic unit now carries the entire load, the sun and ring gear merely acting as a differential means to apply the force of the engine and the rotor to the driven member in proportion to the respective speeds which they may attain with the then vehicle resistance.

Take for another example a different condition wherein moderate acceleration is being effected through the gear-set by the application of say 25 out of a possible 110 H. P., and the load condition becomes such at 10 M. P. H., that the weights 72 overcome the combined force of the springs 56 and the sun gear 120 which together are restraining the weights and keeping the valves closed, and the valves are thereby opened at 10 M. P. H.

The hydraulic unit is now made effective at a much lower speed than in the first example, but the hydraulic unit is efficient at this lower speed for transmitting 25 H. P., whereas it would not have been efficient for transmitting 110 H. P.

If, however, after such a shift up to the hydraulic drive at 10 M. P. H., a traffic condition requiring the maximum possible acceleration suddenly arises, a sudden application of full engine power will cause such a load on the sun gear as to overcome the then existing weight force and the valves will be again closed, restoring gear drive until a higher speed is reached at which the hydraulic unit will be as efficient as the gear-set, whereupon the shift to hydraulic drive will again occur even though maximum power is maintained.

During gear drive the ratio of driver to driven is 3 to 1. This fixed ratio maintains up to the time that opening of the valves starts the ring gear to turn forwardly at any speed in excess of zero R. P. M. As soon as the ring gear starts forwardly, the ratio is less than 3 to 1. As the rotor 26 gains in speed relative to the impeller 20, the ratio of driver to driven progressively changes, i. e., 2.9 to 1, 2.8 to 1, etc., the ratio in fact changing by infinitesimal increment from 3 to 1 until the rotor has reached the speed of the impeller, at which speed the roller brake 106 becomes unloaded and the impeller, rotor, stator, ring gear, sun gear and driven member all rotate forwardly at engine speed.

Of course, a full ratio of 1 to 1 as between impeller and rotor is never fully attained because of hydraulic slip, but the ratio is nearly enough 1 to 1 for all practical purposes.

The advantages of the arrangement will be apparent when it is remembered that a hydraulic unit of the type shown is efficient for transmitting a fraction of its full power when it is operating at relatively low speed, but is not efficient for transmitting its full power until a considerably higher speed is reached, and that the gear-set is arranged to automatically eliminate itself at a low speed if the load is then light enough for the hydraulic unit to carry at high efficiency, but not to eliminate itself until a higher speed is reached when the load is too great for the hydraulic unit to carry effectively at low speed.

Having described my invention, I claim:

1. In transmission mechanism of the character described, an impeller, a rotor, a gear adapted to be revolved in unison with the impeller, a second gear adapted to be revolved in unison with the rotor, a driven member having gearing in mesh with both said gears, valves for closing the spaces between the impeller blades, and a mechanical connection between said first gear and said valves whereby load on said gear urges said valves to remain closed.

2. In transmission mechanism of the character described, an impeller, a rotor, a gear adapted to be revolved in unison with the impeller, a second gear adapted to be revolved in unison with the rotor, a driven member, planet pinions for revolving said driven member, said pinions being in mesh with the first and second gears, valves for closing the spaces between the impeller blades, and linkage connecting all of said valves to said first gear whereby load on said first gear operates to hold said valves closed, said linkage comprising the sole means whereby said impeller may rotate said first gear.

3. In transmission mechanism of the character described, an impeller, a rotor, a gear connected to be revolved in unison with the impeller, a second gear adapted for connection to the rotor, a driven member, planet pinions on the driven member in mesh with both said gears, a clutch for connecting said second gear to said rotor, and a one way brake for holding said rotor from revolving backwardly, when said clutch is disengaged to allow said second gear to revolve backwardly.

4. In transmission mechanism of the character described, an impeller, a rotor, a gear connected to be revolved in unison with the impeller, a second gear adapted for connection to the rotor, a driven member, planet pinions on the driven member in mesh with both said gears, a friction clutch normally connecting said second gear to said rotor, manual means for disengaging said friction clutch, and a one way brake for preventing backward rotation of said rotor, when said clutch is disengaged to allow said second gear to revolve backwardly.

5. In transmission mechanism of the character described, an impeller, a rotor, a stator and two gears in axial alignment, a one way brake for preventing backward rotation of the rotor, a second one way brake for preventing backward rotation of the stator, a clutch for connecting one of said gears to the rotor, means connecting the other of said gears to the impeller, a driven member, and planet pinions carried by the driven member in mesh with both said gears.

6. In transmission mechanism of the character described, an impeller, a rotor, a stator and two gears in axial alignment, a one way brake for preventing backward rotation of the rotor, a second one way brake for preventing backward rotation of the stator, a friction clutch normally connecting one of said gears to the rotor, manual means for disengaging said friction clutch, means connecting the other of said gears to the impeller, a driven member, and planet pinions carried by the driven member in mesh with both said gears.

7. In transmission mechanism of the character described, an impeller, a rotor, a stator and two gears in axial alignment, means for holding the rotor against rotation, a one way brake for holding the stator against backward rotation, a driven member, planet pinions on the driven member in mesh with both said gears, means for connecting one of said gears to the rotor, valves for closing the space between the impeller blades, and means connecting the other gear to said valves whereby load on the said other gear keeps said valves closed.

8. In transmission mechanism of the character described, an impeller, a rotor, a stator and two gears in axial alignment, a one way brake for holding the stator against backward rotation, a clutch for connecting one of said gears to said rotor, means for holding said rotor against backward rotation while said clutch is disengaged, means connecting the other of said gears to the impeller, a driven member, and planet pinions carried by the driven member in mesh with both said gears.

9. In transmission mechanism of the character described, an impeller, a rotor, a stator and two gears in axial alignment, a friction clutch normally connecting one of said gears to the rotor, means for holding said rotor against backward rotation while said friction clutch is disengaged, means to disengage said friction clutch to allow backward rotation of said one gear, means connecting the other gear to the impeller, a driven member, and planet pinions carried by the driven member in mesh with both said gears.

10. In transmission mechanism of the character described, an impeller, a rotor, a stator, a ring gear and a sun gear in axial alignment, a friction clutch normally connecting the ring gear to the rotor, means for holding said rotor against backward rotation while said friction clutch is disengaged, manual means to disengage said friction clutch to allow backward rotation of said ring gear, means connecting the sun gear to the impeller, a driven member, and planet pinions carried by the driven member in constant mesh with said gears.

11. In transmission mechanism of the character described, an impeller, a rotor, a stator, a ring gear, a sun gear, and a driven member, all in axial alignment, planet pinions on said driven member in mesh with both the ring gear and sun gear, a friction clutch normally connecting said ring gear and rotor, manual means to disengage said friction clutch, a one way brake for holding said rotor against backward rotation, valves for closing the spaces between the impeller blades, gear segments on said valves adapted by limited rotation to close said valves, a gear in mesh with said segments, and means joining said gear to said sun gear whereby rotation of one causes rotation of the other.

12. In transmission mechanism of the character described, an impeller, a rotor, a stator, a ring gear, a sun gear, a one way brake for holding the stator against backward rotation, a second one way brake for holding the rotor against backward rotation, a friction clutch normally connecting the ring gear to the rotor, and a driven member, all in axial alignment, planet pinions on the driven member in mesh with both the ring gear and the sun gear, a valve operating gear, a shaft joining the sun gear and valve operating gear, valves for closing the spaces between the impeller blades, and valve closing segments on said valves, said valve closing segments being in constant mesh with said valve operating gear.

13. In transmission mechanism of the character described, an impeller, a rotor, a stator, a one way brake for holding said rotor against backward rotation, a second one way brake for holding said stator against backward rotation, a ring gear, a friction clutch normally connecting said ring gear and rotor, manual means for disengaging said friction clutch, a drive shaft, a sun gear secured to said drive shaft, a driven member, planet pinions carried on said driven member in mesh with both the ring gear and the sun gear, valves for closing the spaces between the impeller blades, valve closing segments on said valves, a valve operating gear secured to the drive shaft in mesh with said segments whereby load on said sun gear holds said valves closed, and means urging said valves to their open position.

14. The combination with an engine, of an impeller driven by said engine, a rotor, a one way brake for holding said rotor against backward rotation, a stator, a one way brake for holding said stator against backward rotation, a ring gear, a friction clutch normally connecting said ring gear to said rotor, manual means for disengaging said friction clutch, a drive shaft, a driven shaft, a sun gear on the drive shaft, planet pinions on the driven shaft in mesh with both ring gear and sun gear, valves for closing the spaces between the impeller blades, valve closing segments on said valves, a valve operating gear secured to the drive shaft in mesh with said segments, whereby a torque load on said sun gear holds said valves closed, and speed responsive means urging said valves to the open position.

15. Automotive power transmission mechanism comprising, an engine, an impeller secured to said engine to be driven thereby, a rotor, a one way brake for holding said rotor against backward rotation, a stator, a one way brake for holding said stator against backward rotation, a ring gear, a friction clutch normally connecting said ring gear to said rotor, manual means for disengaging said friction clutch, a drive shaft, a driven shaft, a sun gear on the drive shaft, planet pinions on the driven shaft in mesh with both ring gear and sun gear, butterfly valves for closing the spaces between the impeller blades, valve stems rotatable to close said valves, valve closing segments on one end of said stems, a valve operating gear secured to said drive shaft in mesh with said segments whereby a torque load on said sun gear hold said valves closed, resilient means cooperating with said torque load to hold said valves closed and weights on the other end of said stems operative by centrifugal force to urge said valves to open.

16. Hydromechanical transmission mechanism comprising, in combination, an engine, a geared torque multiplying unit efficient at low speed and a hydraulic torque multiplying unit efficient at higher speed, one gear of the geared unit and the impeller of the hydraulic unit being secured to the engine to rotate therewith, means normally holding the impeller circulation stopped to render it ineffective at low speed, a speed responsive means associated with the impeller and operative upon a rise in engine speed to render said impeller effective, and means associated with said one gear and with said speed responsive means operative by load on said one gear to oppose operation of said speed responsive means.

17. Hydromechanical transmission mechanism comprising, in combination, a geared torque multiplying unit normally effective at low speed, a hydraulic torque multiplying unit normally effective at higher speed, speed responsive means associated with the driving member of the hydraulic unit operative upon a rise in speed to start operation of the hydraulic unit and discontinue operation of the geared unit, and torque responsive means associated with one of the gears and the speed responsive means operative by torque load on said gearing to cause the speed at which said speed responsive means acts to be higher in proportion as the torque load carried by said gears is greater.

18. Hydromechanical transmission mechanism comprising, in combination, an engine, a driven member, gear means normally connecting said engine to said driven member to multiply the engine torque, hydraulic means adapted to become operative only above a determined engine speed for causing said engine to drive said driven member to multiply the engine torque, speed responsive means associated with the engine operative by engine speed to cause said engine to drive said driven member through said hydraulic means, and torque responsive means connecting said gearing and speed responsive means opposing said speed responsive means to delay operation of said speed responsive means longer as the torque being transmitted through said gears is greater.

19. In combination, an engine crank shaft, an impeller secured thereto, valve means for closing the passage between the impeller blades, a shaft drivably secured to said impeller but adapted by part rotation with respect thereto to close said valve means, a rotor, a gear adapted to be driven by the rotor, a driven member, planet pinions carried by the driven member in mesh with said rotor gear, and a second gear on said shaft in mesh with said planet pinions.

20. In transmission mechanism of the character described, an impeller, valve means for closing the spaces between the blades of the impeller, pinion means rotatable to close said valve means, a rotor, a rotor gear connected to be driven thereby, a driven member, planet pinions carried by said driven member in mesh with said rotor gear, and an impeller shaft carrying one gear in mesh with said planet pinions and another in mesh with said pinion means.

21. Power transmission mechanism comprising, an impeller, a rotor, a gear connected to be revolved in unison with the impeller, a second gear adapted for connection to the rotor, a driven member, planet pinions on said driven member, in mesh with both said gears, a normally engaged clutch connecting said second gear to the rotor, manual means for disengaging said clutch, and friction means associated with and operated by said manual means to restrain said rotor from revolving when said clutch is disengaged.

22. Power transmission comprising, an impeller, a rotor, a gear connected to be revolved in unison with the impeller, a second gear adapted for connection to the rotor, a driven member, planet pinions on the driven member in mesh with both said gears, friction clutch means on said rotor for connecting said second gear to the rotor, manual means for disengaging said clutch, a one way brake on said rotor for holding it against backward rotation, and friction brake means associated with and operated by said manual means to restrain forward rotation of said rotor when said clutch is released to allow said second gear to rotate backwardly.

23. The combination with a fluid coupling of the Föttinger type comprising an impeller and a rotor, each having blades for circulating a liquid medium therebetween, of a gear adapted to be revolved in unison with the impeller, a second gear adapted to be revolved in unison with the rotor, a driven member carrying planet pinions in mesh with both said gears, means normally blocking circulation of said liquid medium but operable to open and permit said circulation, and means connecting the first said gear to said impeller through said blocking means, whereby load on said first gear urges said blocking means to remain in closed position.

FREDERICK W. COTTERMAN.